Dec. 8, 1953    A. VAN DE WIEL    2,662,209
ELECTRIC CIRCUIT

Filed Nov. 23, 1949    4 Sheets-Sheet 1

*INVENTOR.*
ALFRED VAN DE WIEL
BY
    AGENT

Dec. 8, 1953 A. VAN DE WIEL 2,662,209
ELECTRIC CIRCUIT
Filed Nov. 23, 1949 4 Sheets-Sheet 2

*INVENTOR.*
ALFRED VAN DE WIEL
BY
AGENT

INVENTOR.
ALFRED VAN DE WIEL
BY
AGENT

INVENTOR.
ALFRED VAN DE WIEL
BY
AGENT

Patented Dec. 8, 1953

2,662,209

UNITED STATES PATENT OFFICE 2,662,209

ELECTRIC CIRCUIT

Alfred van de Wiel, Eindhoven, Netherlands, assignor to Hartford National Bank and Trust Company, Hartford, Conn., as trustee Application November 23, 1949, Serial No. 129,007

Claims priority, application Netherlands December 23, 1948

7 Claims. (Cl. 321—18)

This invention relates to a rectifier circuit-arrangement comprising at least two-phase connected, controllable gas- or vapour-filled rectifiers which are controlled with the use of a common direct control voltage applied to the control electrodes and an alternating voltage superimposed on the former, the source of direct control voltage being connected to the neutral point of the supply transformer of the rectifiers, and is characterized in that the rectifiers are connected, for their supply, with separate cathodes to an auto-transformer in a manner such that each of the cathodes is connected, relatively to the neutral point of the auto-transformer, to substantially equal alternating voltages, and in that each of the control-electrodes of the rectifiers is connected to a compensating alternating voltage combined with the direct control voltage and the alternating voltage superimposed thereon, by means of which compensation voltage the voltage between the cathodes and the said neutral point, which would produce an undue alternating voltage between the control electrodes and the cathode, is compensated.

In the present case, the aforesaid superimposed alternating voltage is a sinusoidal alternating voltage of the same frequency as the alternating supply voltage.

This rectifier circuit has the advantage that by the use of an auto-transformer the arrangement is much more economical. The apparent disadvantage that the cathodes are connected to an alternating voltage, so that the cathode potential and thus the ignition characteristic curve constantly vary, due to which exact ignition at a desired point of the ignition characteristic curve is not ensured by normal control of the grid voltage which is bound to a point of fixed potential, is obviated by the alternating voltage operative in the control-circuit. The fact that the cathodes and not the anodes are connected to the auto-transformer is based on the recognition that in the latter case the cathodes which are connected, for example interconnected by way of the load, to the centre of the auto-transformer, cannot, in general, be connected to earth, since one of the mains conductors or the neutral point of the auto-transformer is earthed, so that the cathodes are connected to the ripple voltage of the rectifiers. This ripple voltage can practically not be compensated by simple means, so that accurate control is not possible.

The direct control voltage may, for example, be taken from the load for the control at constant voltage with a varying current load, more particularly for controlling direct-current motors.

In order that the invention may be readily carried into effect, a number of examples will now be described in detail with reference to the accompanying drawings.

Figure 1:
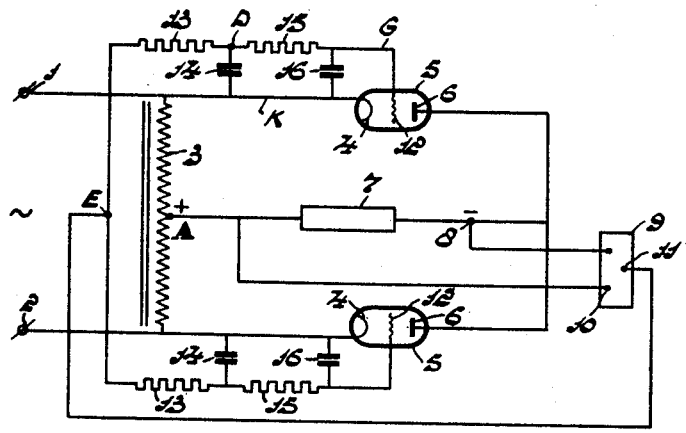
Fig. 1 is a schematic diagram of a preferred embodiment of the invention.

In Fig. 1 of the accompanying drawings, mains terminals 1 and 2 are connected to an auto-transformer 3, the ends of which are connected, in two-phase connection, to the cathodes 4 of the controllable gas- or vapour-filled rectifying tubes 5. The anodes 6 of these tubes are connected to the load 7 (for example a direct-current motor required to be controlled), the other terminal of which is connected in a conventional manner to the neutral point A of the auto-transformer 3. A suitable control-apparatus 9 supplying a direct control voltage to the terminals 10 and 11, which voltage depends upon the voltage requirements imposed on the load 7, is connected, by way of point 8 (and A), in parallel with the said load. This control voltage, in the present case 2 v. (the direct voltage across terminal 11 may be positive or negative relatively to point 10), is connected between the cathodes 4 through the two halves of the auto-transformer and the grids 12 by way of a phase-shifting device which comprises a resistance 13, a condenser 14, a resistance 15 and a condenser 16.

Figure 2:
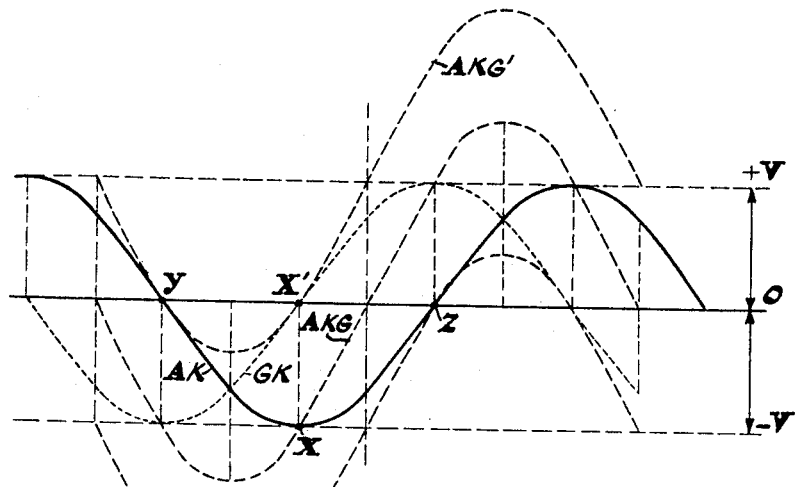
Fig. 2 is a graph explanatory of the operation of the device in Fig. 1.
Figure 3:
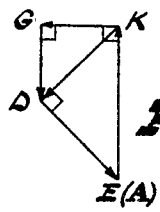
Fig. 3 is a vector diagram explanatory of the operation of the device in Fig. 1.

Relatively to the neutral point A of the auto-transformer 3, the cathodes 4 are consequently connected to an alternating voltage. This is diagrammatically shown in Fig. 2 by the alternating voltage AK. Assuming that the ignition characteristic curve of the rectifiers coincides with the cathode potential, the line K also represents the ignition characteristic curve relatively to point A. In the present case, half the transformer voltage AK of the auto-transformer 3 is shifted in phase approximately 90° by the phase-shifting device and supplied to grids 12, which is shown in a separate vector diagram (Fig. 3). According to Fig. 2, the alternating voltage AK, which is consequently shifted in phase by 90°, is shown as the alternating voltage GK i. e. the voltage between grid G(12) and the cathode lead K(4). Relatively to point A, the two voltages AK and GK may be summated, since both of them occur across the grid circuit 12—15—13—E—11—10—A—K—4. Summation yields the voltage AKG. In the case shown, ignition of that rectifier occurs, the anode voltage of which is positive relatively to the cathode i. e. at X, considered from the neutral point A. If the instant of ignition is considered relatively to the cathode lead K(4), as is customary, ignition occurs at point X' which, however, coincides with X with respect to time, as is indicated by a perpendicular broken line. By raising or lowering the summated voltage AKG by means of the direct control voltage +V or —V, the rectifier tube concerned can be driven completely i. e., in theory, with a phase shift of from 0° to 180°. If the control voltage is +V relatively to the zero line, as shown in the drawing, the summated voltage may be designated AKG' and ignition occurs at point Y at the beginning of the positive half wave. The rectifier then supplies the maximum voltage. If the control voltage is reduced to —V, the summated voltage drops to AKG" and ignition takes place at the end of the half cycle which is positive relatively to the anode of the rectifier, i. e. at point Z. As stated before, the actual ignition relatively to the cathode 4(K) takes place at the point of intersection of the phase-shifted alternating voltage GK and the zero line, the voltage GK, likewise superimposed on the direct control voltage +V or —V yielding also ignitions at Y and Z respectively.

In the circuit-arrangement shown in Fig. 1, the voltages are chosen such that the alternating supply voltage of each of the rectifiers i. e. the voltage AK itself, serves as a compensation voltage for the grid and this in the reversed sense i. e. KA across the grid circuit, which is also due to the fact that the alternating grid voltage across G, after the phase-shift, comes from KA. Thus the compensation voltage KA (which serves as the supply voltage AK), the direct voltage 10—11 and the alternating grid-voltage at G act in the total grid circuit.

It may be seen from the drawing that the peak voltage of GK, $\hat{GK}$, should approximately be equal to the voltage V to enable complete driving of the tube. Actually, this peak voltage may be slightly lower than V, since the rectifier is not driven throughout 180°, but, for example of from 165 to 175°. For the sake of simplicity, it is assumed, however, that:

$$\hat{GK} = V \text{ or } GK = \frac{V}{\sqrt{2}} \quad (1)$$

expressed in effective voltage.

Fig. 3 shows in a vector diagram the alternating voltages and the phase-shifts. The voltage vector GK (across condenser 16 shown in Fig. 1) is at right angles to the vector GD (across resistance 15 in Fig. 1). The resulting voltage DK is again at right angles to the vector DE (across resistance 13). Since the direct voltage 10—11 is not shown in a vector diagram, point E may be assumed to correspond to point A, so that the vector KE=KA=half the auto-transformer voltage (Fig. 1) from which GK is derived.

From the vector diagram we have:

$$GK = \tfrac{1}{2} DK\sqrt{2} \quad (2)$$

and $$DK = \tfrac{1}{2} KE\sqrt{2} \quad (3)$$

or $$GK = \tfrac{1}{2}\sqrt{2} \cdot \tfrac{1}{2} KE\sqrt{2} = \tfrac{1}{2} KE$$

or $$KE = 2GK \quad (4)$$

By substituting (1)

$$GK = \frac{V}{\sqrt{2}}$$

in (4) it follows:

$$KE = 2\frac{V}{\sqrt{2}} = V\sqrt{2} \quad (5)$$

Since KE=KA (Fig. 3) this means that, if half the transformer voltage is equal to $\sqrt{2}\times$half the direct control-voltage, correct compensation is obtained. For example, if the mains voltage is 220 v., KA is 110 v. If the direct control voltage varies from +V to —V=2V=156 v., then V=78 v. and $V\sqrt{2}$ is also 110 v., so that the condition (5) is fulfilled.

However, it often occurs that the available mains voltage has a different value or the direct control-voltage does not correspond to the value 2V=156 v., and the said voltage is obtainable only by means of a much more complicated control apparatus 9 (Fig. 1).

In this case, the circuit referred to does not ensure sufficient compensation, since the condition of the Formula 5 is not fulfilled.

Accordingly, the compensation voltage is obtained with the use of an auxiliary transformer winding which preferably consists of an auxiliary winding provided on the auto-transformer. Since the auxiliary winding need have a slight power only, for example 0.1 w. with a rectifying power of 100 w., the economy of a main winding, owing to the use of an auto-transformer as a supply transformer is not lost.

Figure 4:
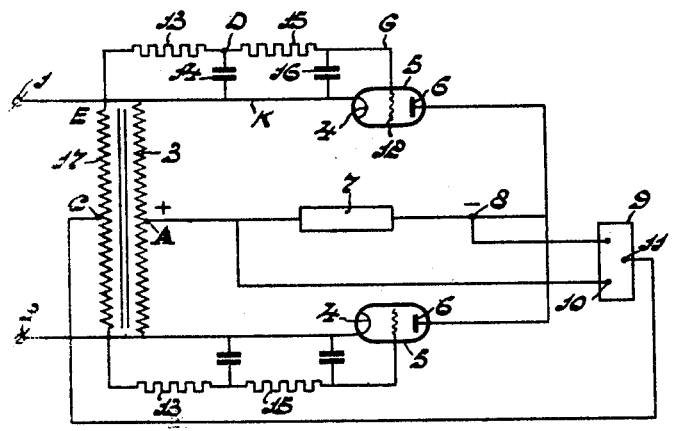
Fig. 4 is a schematic circuit diagram showing a preferred modification of the invention.
Figure 5:
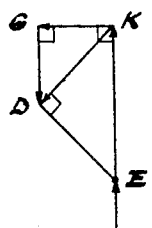
Fig. 5 is a vector diagram explanatory of the operation of the device in Fig. 4.

Fig. 4 shows a similar circuit-arrangement as Fig. 1 with the difference, however, that a compensation auxiliary winding 17 is provided between the two resistances 13, and the direct voltage is applied at the centre C. The vector diagram of this circuit is shown in Fig. 5 and is substantially the same as that of Fig. 3. It differs from the latter only by the added vector EC which is equal to half the voltage of the total auxiliary winding 17. In a similar manner as set out above, it follows:

$$KE = V\sqrt{2} \quad (5)$$

However, half the voltage of the auxiliary winding is now:

$$EC = KC - KE \quad (6)$$

or $$EC = KC - V\sqrt{2} \quad (7)$$

and since the alternating voltage KC is also equal to KA, it follows:

$$EC = KA - V\sqrt{2} \qquad (8)$$

If the mains voltage is, for example, 380 v. and the total direct control voltage for example 100 v., we have $$EC = 190 - 100\sqrt{2} = \text{about } 50 \text{ v.}$$

The auxiliary winding must then supply a total voltage of 100 v.

If the alternating mains voltage is again 380 v. and the direct control-voltage 200 v.

$$EC = 190 - 200\sqrt{2} = -90 \text{ v.}$$

Figure 6:
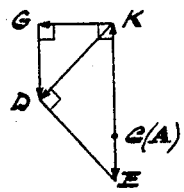
Fig. 6 is another vector diagram explanatory of the behavior of the device in Fig. 4.

The auxiliary winding must then supply 180 v. and should be connected in a reversed sense, since EC is negative. The vector diagram then becomes as is diagrammatically shown in Fig. 6.

If the mains voltage is 220 v. and the direct control voltage 156 v., we have:

$$EC = 110 - 78\sqrt{2} = 0$$

in other words the auxiliary winding may be dispensed with, so that the circuit shown in Fig. 1 remains.

Figure 7:
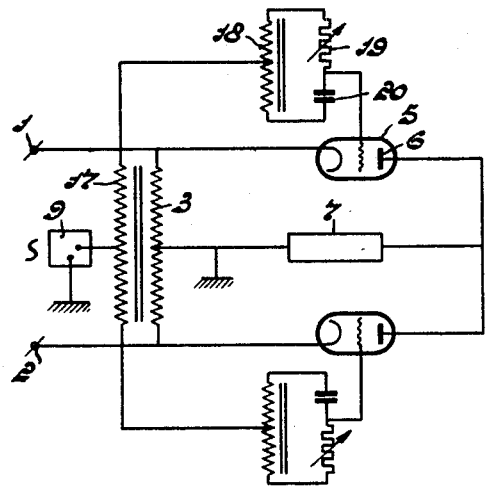
Fig. 7 is a schematic circuit diagram of another embodiment of the invention.

If, for some reason, a different phase-shifting circuit is desired, use may be made of the circuit shown in Fig. 7, in which the phase-shift is achieved with the use of an inductance 18 with a central tap, a variable resistance 19 and a condenser 20. The voltage across the auxiliary transformer winding 17 should then be made higher in accordance with the value of the inductance 18. In the case shown, the control-device 9 is manually adjusted.

Figure 8:
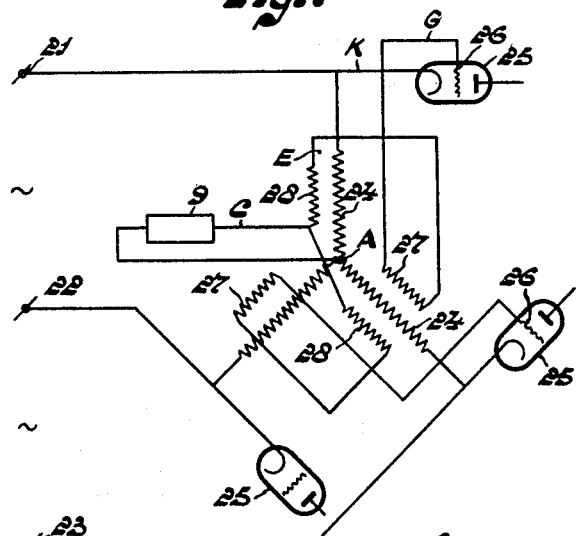
Fig. 8 is a schematic diagram of yet another embodiment of the invention.

In a three-phase rectifying circuit-arrangement according to the invention, the arrangement may be as shown in Fig. 8.

In this figure, the mains terminals are designated 21, 22 and 23, to which the three-phase auto-transformer 24 is connected. The rectifier tubes 25 comprise grids 26, each of which is connected to an auxiliary winding 27, the voltage of which is shifted in phase by 120° relatively to the cathode voltage set up at 24, and to the auxiliary transformer winding 28 which is connected in series with the winding 27. The ends of the winding 28 are connected to the control-apparatus 9, by means of which the direct voltage is adjusted which is applied to the neutral point of the auto-transformer. The winding 28 contributes to the compensation, the winding 27 providing the 120° phase-shift for the tube 25. The further rectifiers are connected in a similar manner. The control-circuit of the tube shown at the extreme left has been omitted for the sake of simplicity.

Figure 9:
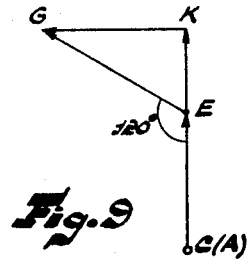
Fig. 9 is a vector diagram explanatory of the operation of the device in Fig. 8.

The vector diagram of this circuit-arrangement is shown in Fig. 9.

Figure 10:
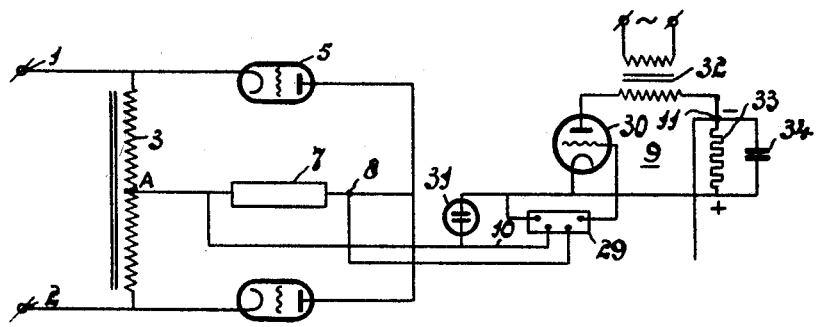
Fig. 10 is a schematic diagram of a system in accordance with the invention.

A circuit for the control-apparatus 9 proper, which is particularly suitable to be combined with the circuit according to the invention, is shown in principle in Fig. 10. The voltage applied to the load 7 is supplied to a control-apparatus 29 by means of which the grid voltage of the auxiliary rectifying tube 30 is influenced. The cathode of this tube is connected, by way of a stabilising tube 31, to the centre A of the auto-transformer 3. The auxiliary tube 30 is fed from an auxiliary transformer 32 and has, as a load, a resistance 33 with which a smoothing condenser is connected in parallel. Owing to the interposition of the stabilizing tube 31, the cathode of tube 30 is, for example, at a potential of +80 v. relatively to point A. If the voltages across the control apparatus are chosen to be such that the voltage across resistance 33, under the action of the control-apparatus 29, may vary from 0 to −160 v. at the grid of tube 30, point 11 will consequently vary from +80 v. to −80 v., which yields the direct control voltage of +V to −V referred to.

Figure 11:
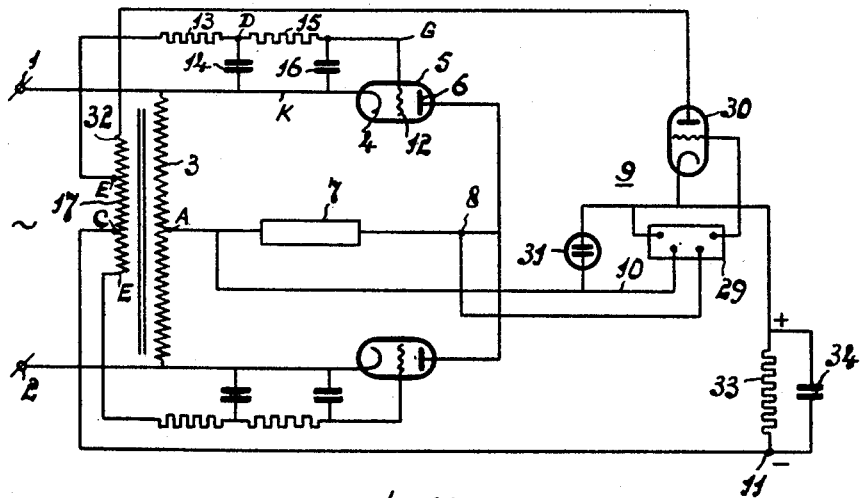
Fig. 11 is a schematic diagram of a modification of the system shown in Fig. 10.

As stated, the circuit of the control-apparatus 9 is particularly suitable for use in an arrangement according to the invention, since the auxiliary transformer 32 may be combined with the auxiliary transformer winding 17 which contributes to the compensation. Such a combination is shown in Fig. 11, in which corresponding parts bear the same reference numerals. From the explanation of the diagram shown in Fig. 10, the operation of the circuit shown in Fig. 11 will be obvious. In this latter circuit, the arrangement is further simplified and rendered more economical by the use of an auxiliary transformer winding 17 which supplies both part of the compensation voltage and the anode voltage for the control apparatus.

What I claim is:

1. A polyphase rectifier circuit for converting alternating voltages to a direct output voltage and supplying said output voltage to a variable impedance load, said circuit comprising an autotransformer adapted for polyphase operation and having a neutral voltage point, a plurality of gaseous electron discharge tubes, each tube having a cathode, a control grid and an anode, said plurality corresponding to the number of voltage phases used, means to supply said alternating voltages through said autotransformer to the respective cathodes of said tubes, the magnitude of said voltages between said cathodes and said neutral point being substantially equal, the anodes of said tubes being connected through said load to said neutral point, means coupled to said autotransformer for supplying alternating compensating voltages to the respective control grids of said tubes, said alternating compensating voltages having values and acting in directions at which the effects of said alternating voltages on said neutral point are neutralized, whereby said neutral point is rendered insensitive to voltage fluctuations, a control device coupled to said neutral point and responsive to the voltage produced across said load for deriving therefrom a direct control voltage, means to superimpose said control voltage on said alternating compensating voltages supplied to the respective control grids of said tubes to govern the firing period of said tubes in a direction at which said direct output voltage is maintained at a constant value despite variations in said load impedance.

2. A circuit as set forth in claim 1 wherein said control device includes an auxiliary rectifier and wherein the voltage supplied to said auxiliary rectifier is dependent upon said alternating compensating voltages.

3. A circuit as set forth in claim 1 wherein the alternating voltages supplied to said cathodes are equal to the alternating compensating voltages supplied to said control grids and wherein said means for supplying said alternating compensating voltages to said control grids include phase shifting networks.

4. A circuit as set forth in claim 3 wherein each of said alternating compensating voltages has a root-mean-square magnitude V at which the firing angle of each of said gaseous discharge tubes has a range of 180°.

5. A circuit as set forth in claim 3 wherein each of said phase shifting networks establishes a phase shift of at least 90°.

6. A polyphase rectifier circuit for converting alternating voltages to a direct output voltage and supplying said output voltage to a variable impedance load, said circuit comprising an autotransformer adapted for polyphase operation and having a neutral voltage point, said autotransformer having a first auxiliary winding, a plurality of gaseous electron discharge tubes, each tube having a cathode, a control grid and an anode, said plurality corresponding to the number of voltage phases used, means to supply said alternating voltages through said autotransformer to the respective cathodes of said tubes, the magnitude of said voltages between said cathodes and said neutral point being substantially equal, the anodes of said tube being connected through said load to said neutral point, means including a phase shifting network and coupled to the first auxiliary winding of said autotransformer for supplying alternating compensating voltages to the respective control grids of said tubes, said compensating voltages having values and acting in directions at which the effects of said alternating voltages on said neutral point are neutralized, whereby said neutral point is rendered insensitive to voltage fluctuations, a control device coupled to said neutral point and responsive to the voltage produced across said load for deriving therefrom a direct control voltage, means to superimpose said control voltage on said alternating compensating voltages supplied to the respective control grids of said tubes to govern the firing period of said tubes in a direction at which said direct output voltage is maintained at a constant value despite variations in said load impedance.

7. A polyphase rectifier circuit for converting polyphase alternating voltages to a direct output voltage and supplying said output voltage to a variable impedance load, said circuit comprising an autotransformer adapted for polyphase operation and having a neutral voltage point, said autotransformer having first and second auxiliary windings, a plurality of gaseous electron discharge tubes, each tube having a cathode, a control grid and an anode, said plurality corresponding to the number of voltage phases used, means to supply said polyphase voltages through said autotransformer to the respective cathodes of said tubes, the magnitude of said voltages between said cathodes and said neutral point being substantially equal, the anodes of said tube being connected through said load to said neutral point, means including phase shifting networks and coupled to said first and second auxiliary windings for supplying alternating compensating voltages to the respective control grids of said tubes, said alternating compensating voltages having values and acting in directions at which the effects of said polyphase voltages on said neutral point are neutralized, whereby said neutral point is rendered insensitive to voltage fluctuations, a control device coupled to said neutral point and responsive to the voltage produced across said load for deriving therefrom a direct control voltage, means to superimpose said control voltage on said alternating compensating voltages supplied to the respective control grids of said tubes to govern the firing period of said tubes in a direction at which said direct output voltage is maintained at a constant value despite variations in said load impedance.

ALFRED van de WIEL.

References Cited in the file of this patent

UNITED STATES PATENTS

| Number | Name | Date |
|---|---|---|
| 1,944,756 | Quarles | Jan. 23, 1934 |
| 2,086,994 | Barz et al. | July 13, 1937 |
| 2,133,850 | Demontvignier | Oct. 18, 1938 |
| 2,373,750 | Faulkner | Apr. 17, 1945 |
| 2,443,638 | Potter | June 22, 1948 |